United States Patent
Genter et al.

[11] Patent Number: 5,997,260
[45] Date of Patent: *Dec. 7, 1999

[54] AIR COMPRESSOR ENGINE BARRING ADAPTOR

[75] Inventors: David P. Genter; J. Eric Parlow, both of Columbus; Roger L. Sweet, Deputy; Nathan Ritchie, Columbus, all of Ind.

[73] Assignee: Cummins Engine Co., Ltd., Columbus, Ind.

[ * ] Notice: This patent is subject to a terminal disclaimer.

[21] Appl. No.: 09/221,891

[22] Filed: Dec. 28, 1998

Related U.S. Application Data

[63] Continuation of application No. 08/720,813, Oct. 1, 1996, Pat. No. 5,882,181.

[51] Int. Cl.$^6$ .............................. F04B 35/00; F02B 33/00
[52] U.S. Cl. ........................................ 417/364; 123/559.1
[58] Field of Search .............................. 417/364; 74/625; 123/198 R, 559.1

[56] References Cited

U.S. PATENT DOCUMENTS

| | | |
|---|---|---|
| 2,288,228 | 6/1942 | De Biasse . |
| 2,667,049 | 2/1954 | Guernsey et al. ................... 123/559.1 |
| 3,321,985 | 5/1967 | Wheeler . |
| 3,395,588 | 8/1968 | Bleigh et al. . |
| 3,838,614 | 10/1974 | O'Donnell . |
| 4,422,656 | 12/1983 | Kaplan et al. . |
| 4,580,534 | 4/1986 | Blum et al. . |
| 4,594,992 | 6/1986 | Nakamura et al. ..................... 123/559 |
| 5,425,345 | 6/1995 | Lawrence et al. .................... 123/559.1 |
| 5,433,180 | 7/1995 | Hitomi et al. ........................... 123/311 |
| 5,448,982 | 9/1995 | Arakawa et al. ..................... 123/559.1 |
| 5,460,138 | 10/1995 | Hasegawa . |
| 5,460,145 | 10/1995 | Perry, Jr. ............................... 123/559.1 |
| 5,713,330 | 2/1998 | Hitomi et al. ........................... 123/311 |

FOREIGN PATENT DOCUMENTS

| | | | |
|---|---|---|---|
| 403092542 | 4/1991 | Japan ................................. 123/559.1 |
| 406257461 | 9/1994 | Japan ................................. 123/559.1 |
| 485938 | 5/1938 | United Kingdom ................... 123/119 |

Primary Examiner—Timothy S. Thorpe
Assistant Examiner—Ehud Gartenberg
Attorney, Agent, or Firm—Leydig, Voit & Mayer, Ltd.

[57] ABSTRACT

In an internal combustion engine, a barring adapter member is mounted on an auxiliary engine component, such as an air compressor shaft which is geared to the engine crankshaft. The barring adapter member is configured to receive a barring tool, permitting manual rotation of the air compressor shaft for desirably positioning engine crankshaft-driven components during engine repair or adjustment. In an arrangement according to the invention, the air compressor gear is enclosed by a gear casing, but the adapter is accessible through an aperture closeable by a removable cap. The barring adapter member facilitates barring the engine from a convenient position and is particularly advantageous in an engine designed to eliminate most externally-exposed rotational shaft seals and associated external pulleys conventionally used as barring locations.

17 Claims, 4 Drawing Sheets

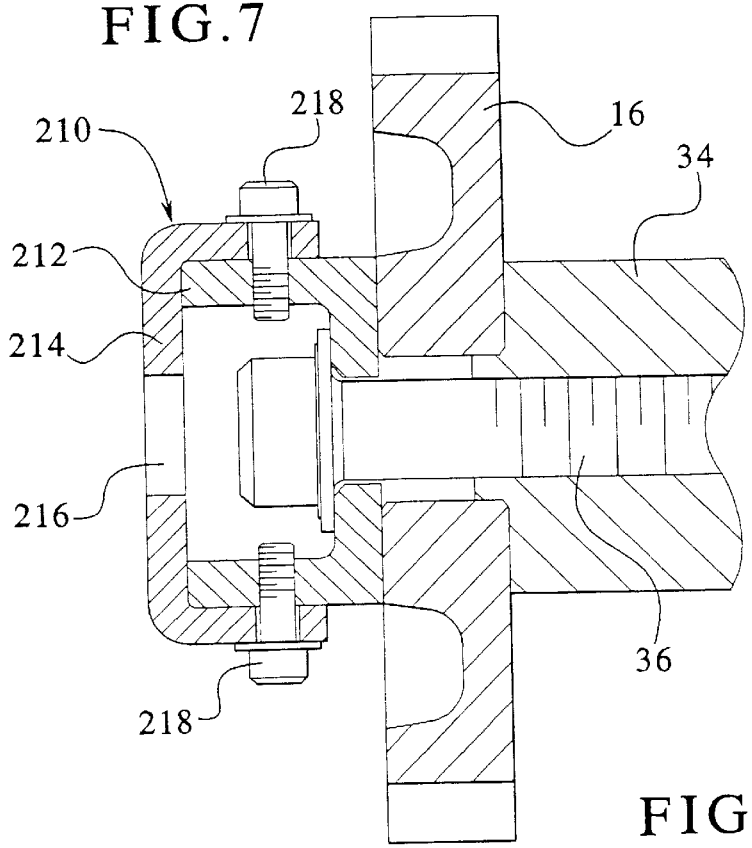
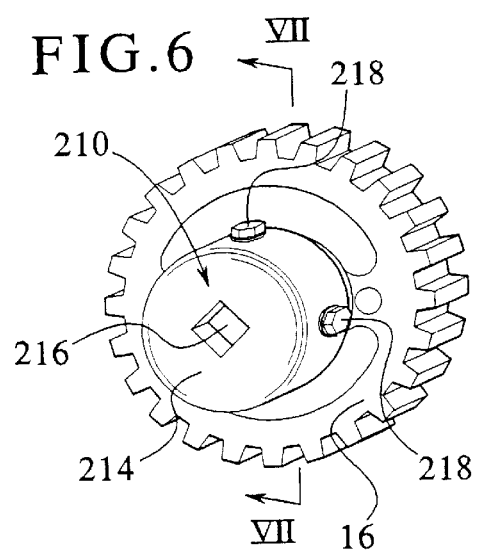
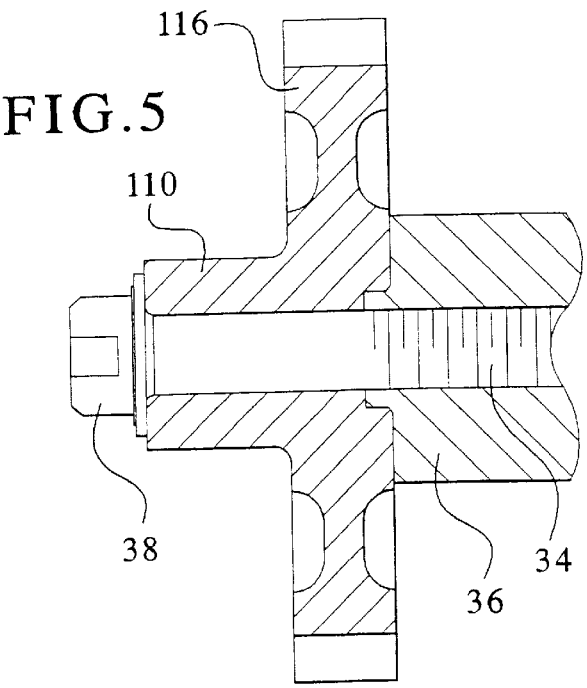

AIR COMPRESSOR ENGINE BARRING ADAPTOR

CROSS-REFERENCE TO RELATED APPLICATION

This is a continuation of U.S. Ser. No. 08/720,813, filed Oct. 1, 1996.

BACKGROUND OF THE INVENTION

The present invention generally relates to internal combustion engines. More specifically, the invention relates to a device and arrangement which facilitates the manual rotation or "barring" of engine crankshaft-driven components during adjustment or repair.

In internal combustion engines, many components are synchronously actuated by the engine crankshaft, e.g., valves, fuel injectors, and other timed components. Thus, in the adjustment or repair of such engine components, the crankshaft is manually rotated or "barred over" to bring the selected parts to a desired position. Barring is done during valve lash adjustment, setting injector travel, and other repairs. Particularly on large diesel engines, barring has conventionally been accomplished by rotating an external accessory drive pulley driven by a crankshaft-mounted pulley. Each external pulley requires an external rotational shaft seal on the engine casing.

State-of-the-art engine design, however, avoids externally-exposed rotational shaft seals when possible, hence eliminating external pulleys which could be used for barring. For example, an engine developed by Cummins Engine Co. has no external accessory drive pulley and, in fact, has no external rotational shaft seals except at the crankshaft. Instead, this engine has a front gear casing which seals and encloses a series of crankshaft-driven drive gears. These enclosed gears operate rotational components including an air compressor. Of course, the elimination of expensive external rotational seals minimizes possible leakage points and intrusion of external debris. This can reduce wear and increase mileage between overhauls.

An engine without an accessory drive pulley, such as the engine described above, could possibly be barred over by directly rotating the exposed crankshaft nose. Unfortunately, the crank nose location is impractically difficult to access when the engine is mounted on a truck chassis. This is because the crank nose is located in a low position close to the truck frame. Also, the crankshaft nose is inconveniently far from a mechanic's common work position during barring—near the head of the engine where the valves and injectors are located. A barring location higher on the engine is desirable so that a mechanic can torque the barring tool while also having convenient access to components at the engine head.

Given the elimination of conventional barring points at external pulleys on modern engines, a need exists for a new device and arrangement to facilitate convenient engine barring.

SUMMARY OF THE INVENTION

The present invention provides an engine barring adapter member and arrangement which permits barring over an engine from an auxiliary component mounted on the engine, preferably an air compressor. The air compressor includes an auxiliary drive shaft or air compressor shaft having with an auxiliary drive gear or air compressor gear mounted thereon. The air compressor gear is drivably engaged with the engine crankshaft by drive gears. Barring from the air compressor shaft thereby transmits rotation to the drive shaft, moving all mechanically synchronized components, e.g., camshafts, valves and fuel injectors.

To this end, a barring adapter member is secured to the air compressor shaft. The barring adaptor member may be mounted to either the air compressor gear or air compressor shaft, since those parts are rotationally fixed. The barring adapter may be either a male or female member configured to engage a barring tool or wrench. Thus, an application of torque to the barring adapter rotates the air compressor gear, resulting in rotation of other engine components. An embodiment of the invention provides a method of making an engine having such a barring adapter.

In accordance with a preferred embodiment of the invention, the barring adapter is in a front gear casing of an engine, the casing enclosing at least some of the rotatable engine components. The gear casing has an aperture therein through which the adapter may be accessed. A sealed cap is removably securable over this aperture.

An advantage of the present invention is that it provides an engine barring means which does not require access to an external rotational component. This improvement is significant in that it maintains the integrity of a modern engine having a reduced number of external shaft seals.

Another advantage of the present invention is to provide an engine having a convenient engine barring arrangement which a mechanic may easily access from the side of a truck. The barring arrangement is convenient since, in a preferred embodiment, the barring adapter member and air compressor gear are mounted at a central or upper portion of the front of the engine.

Additional features and advantages of the present invention are described in, and will be apparent from, the detailed description of the preferred embodiments, drawings and claims.

BRIEF DESCRIPTION OF THE DRAWINGS

FIG. 5 is a sectional view of an embodiment similar to FIG. 4, but wherein the barring adapter and air compressor gear are integral.

FIG. 6 is an isometric view of a female barring adapter, cap screw, and air compressor gear according to another embodiment of the invention.

FIG. 7 is a sectional view taken generally along line VII—VII of FIG. 6.

DETAILED DESCRIPTION OF THE PREFERRED EMBODIMENTS

Figure 1:
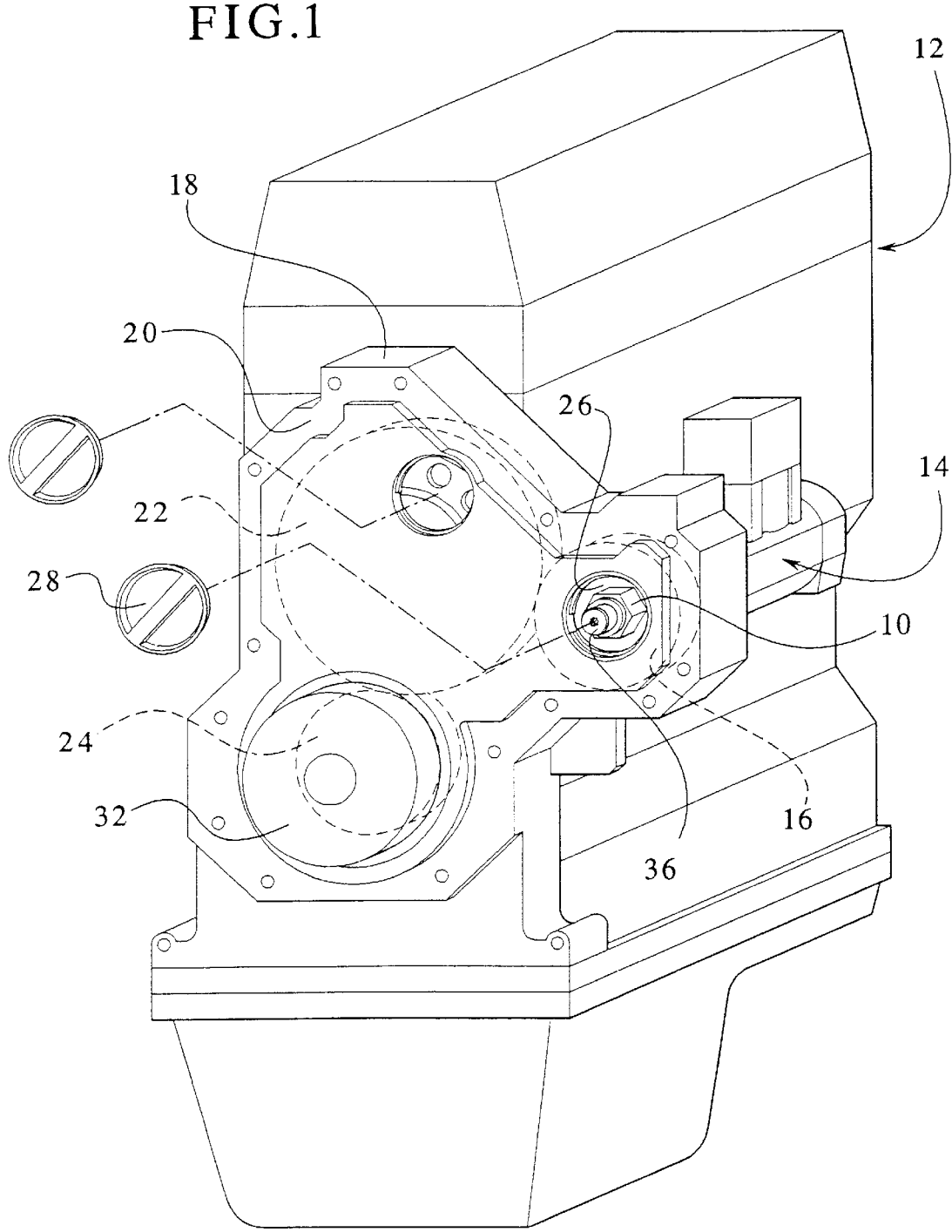
FIG. 1 is an isometric view of an engine incorporating the features of the present invention.
Figure 2:
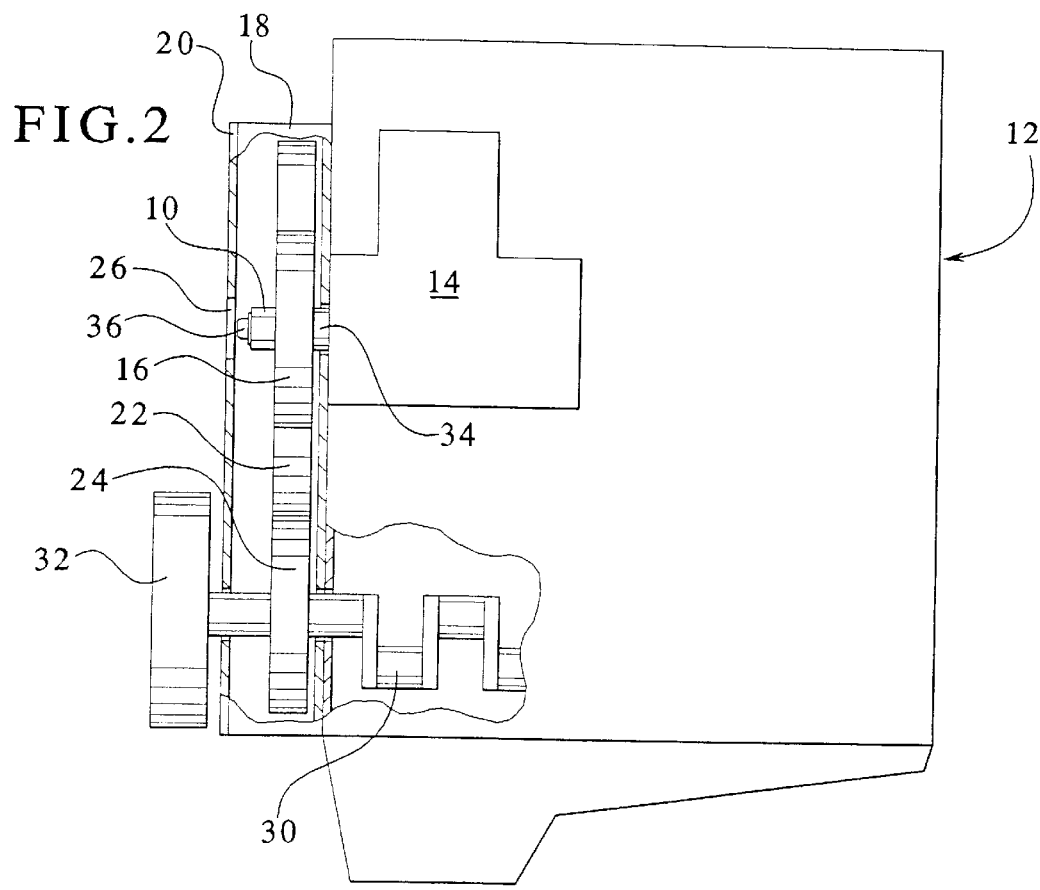
FIG. 2 is a schematic side elevation of the engine of FIG. 1 having broken-away portions.

In accordance with a preferred embodiment of the invention, as depicted in FIGS. 1 and 2, an engine 12 includes a barring adapter member 10. The engine 12 includes an air compressor 14 which is driven by a rotatable air compressor gear 16 which drives an air compressor shaft 34. According to the present invention, the air compressor gear 16 acts as a barring gear. The barring adapter member 10 is secured to the air compressor gear 16 and to air compressor shaft 34 by a shaft securing means.

In a particular arrangement of the invention, the engine 12 includes a shrouded gear assembly at the front of the engine. More specifically, a gear casing is formed by a gear housing 18 and a gear cover wall 20 to enclose the air compressor gear 16 as well as an idler gear 22, a crank gear 24, and possibly other gears (not shown) driving components such as camshafts. The air compressor 14 is mounted externally at a rear of the gear housing 18, with the air compressor shaft 34 extending through to an interior of the housing 18.

As shown in FIGS. 1 and 2, the barring adapter member 10 is generally located at a central-to-upper portion of the front of the engine 12. As discussed above, this location is advantageously convenient from the perspective of a mechanic performing a typical repair. A closeable aperture 26 is formed in the gear cover wall 20 forwardly of the air compressor 14 for access to the barring adapter member 10. The aperture 26 is closeable by a removable cap 28 which fits securely with a threaded engagement. The cap 28 includes a rubber seal for sealing the access aperture 26.

The gears 16, 22 and 24 are operably engaged with one another in an interdigitated manner so that rotation of the air compressor gear 16 is transmitted through the idler gear 22 to rotate the crank gear 24, and vice versa. The crank gear 24 is mounted to a crankshaft 30 of the engine (FIG. 2), as is a drive pulley 32 disposed externally to the gear casing 18, 20. The external drive pulley 32 has a rotating shaft seal at the gear cover wall 20. FIGS. 1 and 2 show the air compressor gear 16 being positioned on a vertically higher axis than the crankshaft 30.

Figure 3:
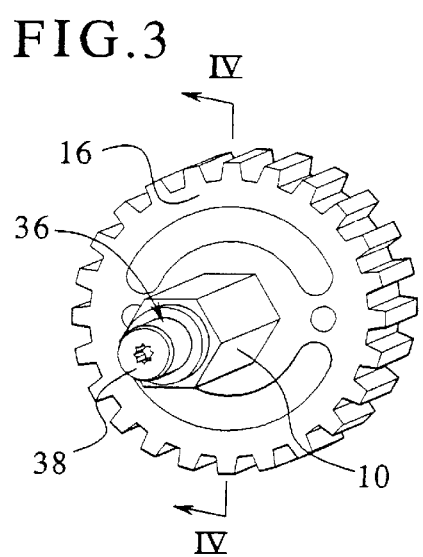
FIG. 3 is an isometric view of a male barring adapter, cap screw, and air compressor gear from the engine shown of FIG. 1.
Figure 4:
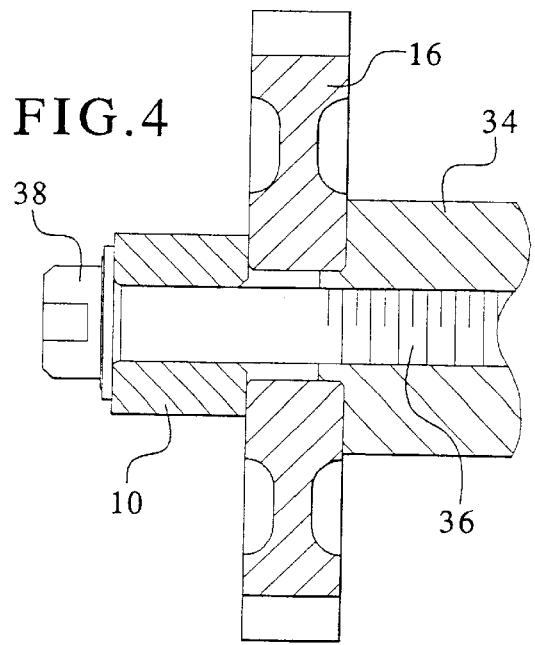
FIG. 4 is a sectional view taken generally along line IV—IV of FIG. 3.

Referring to FIGS. 3 and 4, an embodiment of the barring adapter member 10 is illustrated in greater detail. The barring adapter member 10 has a tool engaging portion, which is shown in a hex-shaped male configuration adapted to be engaged by a barring tool (not shown) having a correspondingly hex-shaped female socket. The barring adapter 10 and air compressor gear 16 are telescopically received on an air compressor crankshaft 34, and are fixedly secured in a stacked manner to the crankshaft 34 by a cap screw 36. Providing a means for fixedly connecting the barring adapter member 10 to an air compressor shaft, the cap screw 36 extends axially through the barring adapter member 10 and air compressor gear 16, and is threaded into the air compressor crankshaft 34. The cap screw 36 has a head 38 which tightens against the barring adapter member 10, thereby holding the barring adapter member 10, air compressor gear 16, and air compressor crankshaft 34 frictionally against one another. The head 38 of the cap screw 36 can have a star-shaped socket, as shown.

Ordinarily, barring with the cap screw 36 is not encouraged, since doing so risks undesirably overtightening or loosening of the cap screw 36. However, it is within the scope of the invention to provide barring with the cap screw 36, if the cap screw 36 is set with sufficient force that it will not be overcome by the expected barring torque. For example, such a cap screw could have a hex-shaped outer surface (not shown) similar to the barring adapter member 10. The illustrated embodiments are preferred because the risk of overtorquing or loosening the cap screw 36 is reduced.

As further means for fixedly connecting the barring adapter member 10 to the air compressor shaft 34, the adapter member 10, gear 16 and air compressor shaft 34 could also be splined or notched together for additional rotational interlocking. Also, in an embodiment, the air compressor gear 16 may be shrink-fit onto the air compressor shaft. Furthermore, the adapter may be welded, unitarily forged, formed on, or otherwise connected to the air compressor gear 16 and/or air compressor shaft 34. For example, FIG. 5 illustrates a barring adapter member 110 according to another embodiment of the invention. As shown, the barring adapter member 110 is unitarily formed with the air compressor gear 16.

Turning to FIGS. 6 and 7, an embodiment of the invention provides a barring adapter member 210 including an adapter base 212 and a shaped barring plate 214. The adapter base 212 acts as a shaft mounting portion, and is secured between the head 38 of the cap screw 36 and the air compressor gear 16. The adapter base 212 is generally cylindrical, having a recess defining an interior containing the head 38 of the cap screw 36. The barring plate 214 is a tool engaging portion, having a female barring opening 216 formed in the plate 214 for receiving a correspondingly-shaped barring tool (not shown). As shown, the barring opening 216 is square, but could be any other torque-bearing shape as well. In the embodiment of FIGS. 6 and 7, the plate 214 has a generally cylindrical, depending peripheral flange or sidewall which is received over the base 212. Bolts 218 are disposed radially through the cylindrical side of the plate 214 and are threaded to the base 21.

Figure 9:
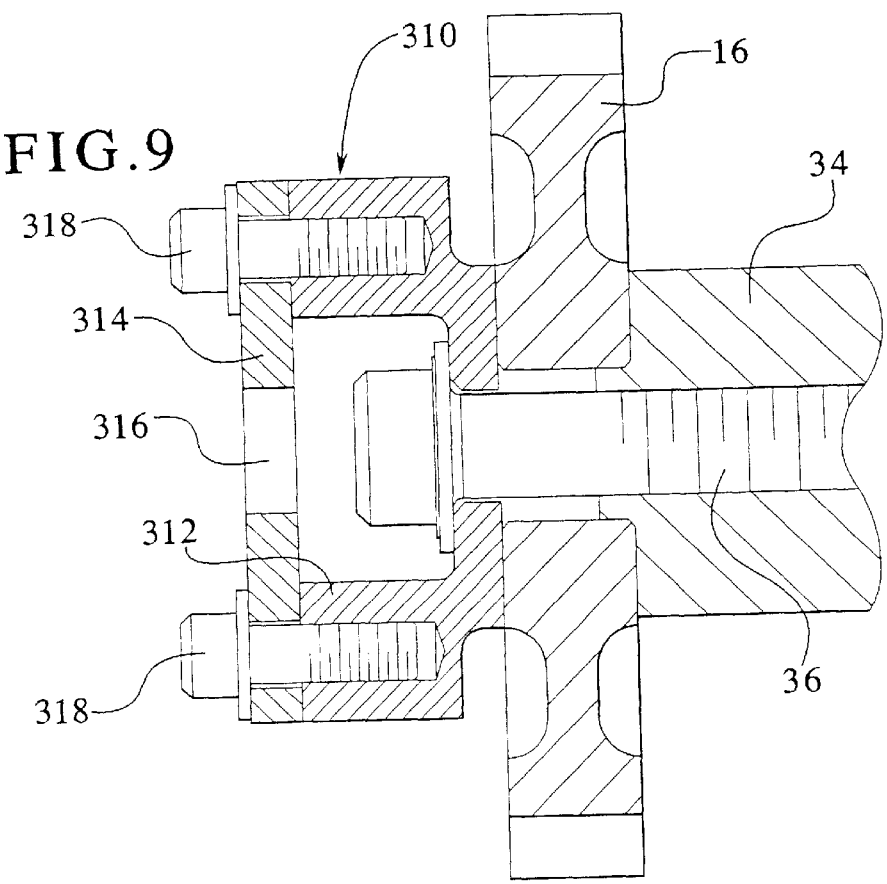
FIG. 9 is a sectional view taken generally along line IX—IX of FIG. 8.
Figure 8:
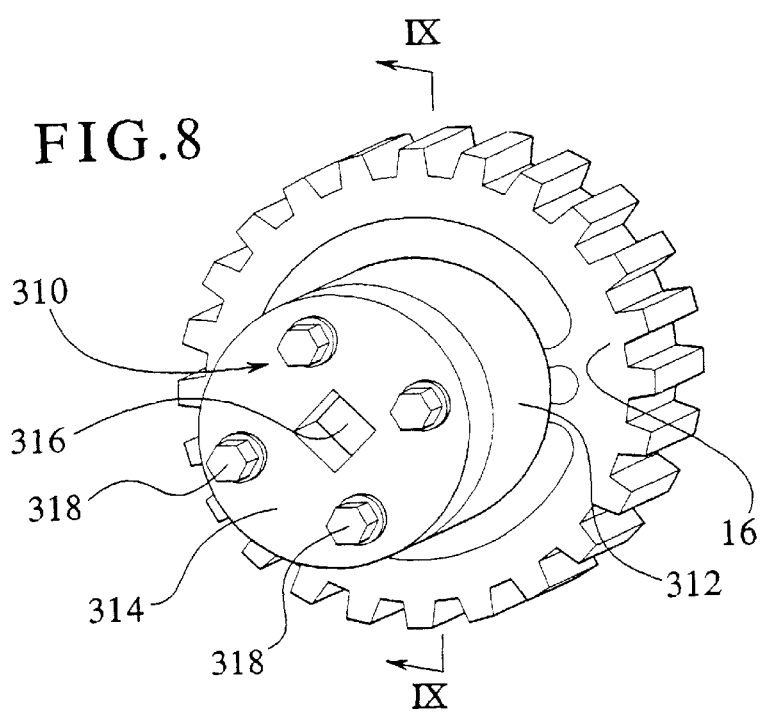
FIG. 8 is an isometric view of a female barring adapter, cap screw, and air compressor gear according to another embodiment of the invention.

FIGS. 8 and 9 show another embodiment with a female barring adapter member 310. The barring adapter 310 also includes an adapter base 312 for mounting the adapter member to the shaft 34 and a barring plate 314 with a barring opening 316 for engaging a tool. The base 12 is secured between the head 38 of the cap screw 36 and the air compressor gear 16, fixedly connecting the adapter member 310 relative to the shaft 34. In this embodiment, the plate 314 is generally flat and defines an end face. Bolts 318 extend through the plate 314 from the end face and are threaded to the base 312 in a direction parallel to the axis of the air compressor shaft 34.

It should be understood that various changes and modifications to the preferred embodiments will be apparent to those skilled in the art. For example, although the described embodiments are associated with an air compressor, the invention also extends to a barring adapter connected to an equivalent engine crankshaft-driven component, including any crank-driven gear, such as an idler gear, or a gear driving a pump, alternator, etc. Also, the barring adapter tool engaging portion could be provided in various male or female forms, so long as it facilitates the rotation of the associated shaft and gear. Moreover, the air compressor gear could be in a direct engagement with the crank gear or in indirect engagement via multiple intermediate idler gears. Such apparent changes and modifications may be made without departing from the spirit and scope of the present invention and without diminishing its attendant advantages. Therefore, the appended claims are intended to cover such changes and modifications.

What is claimed is:

1. An engine barring adapter comprising a barring adapter member including a shaft mounting portion, a tool engaging portion, and a cap screw fixedly connecting the shaft mounting portion to an air compressor shaft drivably connected to an engine crankshaft, the cap screw extending through the barring adapter member and disposed in threaded engagement with the air compressor shaft.

2. An engine barring adapter according to claim 1, wherein the barring adapter member is unitarily formed with an air compressor gear.

3. An engine barring adapter comprising a barring adapter member fixedly mounted to an end of an air compressor shaft, the end of the air compressor shaft having an air compressor gear fixedly mounted thereon, and the air compressor gear being operably engaged with a crank gear fixedly mounted on an engine crankshaft, such that rotation of the barring adapter causes rotation of the air compressor gear, which in turn causes rotation of the crank gear and engine crankshaft.

4. An engine barring adapter as defined in claim 3, wherein the barring adapter member is disposed in a tool-accessible location extending from a front portion of said engine.

5. An engine barring adapter according to claim 3, wherein the barring adapter member includes a tool-engaging portion configured to cooperatively engage a tool to permit manual rotation.

6. The engine barring adapter according to claim 5, wherein the tool-engaging portion has an external hex-shaped male configuration.

7. An engine barring adapter as defined in claim 3, wherein the barring adapter member is unitarily formed with the air compressor gear.

8. An engine barring adapter as defined in claim 3, wherein at least one idler gear is provided in intermediate the air compressor gear and the crank gear.

9. A barrable engine comprising:
    an auxiliary drive gear mounted on an auxiliary drive shaft disposed at a front of an engine;
    a crank gear mounted to an engine crankshaft, the crank gear being disposed in a constant driving relationship with the auxiliary drive gear; and
    a barring adapter member accessibly mounted on a front end of the auxiliary drive shaft to permit manual rotation of an air compressor gear, which in turn causes rotation of the crank gear and crankshaft;
    wherein the auxiliary drive gear and auxiliary drive shaft are an air compressor gear mounted on an air compressor shaft.

10. A barrable engine as defined in claim 9, further comprising:
    an idler gear disposed intermediately between the crank gear and the auxiliary drive gear so that rotation of the auxiliary drive gear transmits rotation to the idler gear, which transmits rotation to the crank gear.

11. A barrable engine as defined in claim 9, further comprising:
    a cap screw which holds the barring adapter member and auxiliary drive gear to the auxiliary drive shaft.

12. A barrable engine as defined in claim 9, wherein the cap screw extends through the barring adapter and auxiliary drive gear and is disposed in an axially threaded engagement with the auxiliary drive shaft, the cap screw holding the barring adapter, auxiliary drive gear and auxiliary drive shaft together in a stacked manner.

13. A barrable engine as defined in claim 9, wherein the barring adapter is accessibly-located generally at a central or upper portion of a front of said engine.

14. A method of making a barrable engine, the method comprising the steps of:
    providing an engine with a rotatable crankshaft having a crank gear fixedly connected thereto;
    providing an air compressor mounted adjacent a front of the engine, the air compressor including a rotatable air compressor shaft, the shaft having a front end with an air compressor gear fixedly disposed thereon so that the air compressor gear is drivably engaged with the crank gear; and
    fixedly connecting a barring adapter member on the front end of the air compressor shaft at the front of the engine, so that manually turning the barring adapter member rotates the air compressor gear, in turn causing rotation of the crank gear and crankshaft.

15. A method as defined in claim 14, further comprising:
    providing a gear casing mounted on the front of the engine enclosing the barring adapter member, air compressor gear and crank gear therein, the gear casing including an aperture located forwardly of the barring adapter member;
    providing a removable cap in a threaded and sealed engagement with the gear casing to close the aperture.

16. An engine barring adapter comprising a barring adapter member including a shaft mounting portion, a tool engaging portion, and means for fixedly connecting the shaft mounting portion to an air compressor shaft drivably connected to an engine crankshaft, wherein the barring adapter member is unitarily formed with an air compressor gear.

17. A barrable engine comprising:
    an auxiliary drive gear mounted on an auxiliary drive shaft disposed at a front of an engine;
    a crank gear mounted to an engine crankshaft, the crank gear being disposed in a constant driving relationship with the auxiliary drive gear;
    a barring adapter member accessibly mounted on a front end of the auxiliary drive shaft to permit manual rotation of an air compressor gear, which in turn causes rotation of the crank gear and crankshaft;
    a gear casing enclosing the auxiliary drive gear and the crank gear;
    a sealable access aperture formed in the gear casing; and
    a removable access cap threadably engageable with the gear casing to sealably close the access aperture.

* * * * *